(12) United States Patent
Takahashi

(10) Patent No.: US 12,153,991 B2
(45) Date of Patent: Nov. 26, 2024

(54) LABEL PRINTER AND CONTROL METHOD OF A LABEL PRINTER

(71) Applicant: TOSHIBA TEC KABUSHIKI KAISHA, Tokyo (JP)

(72) Inventor: Keisuke Takahashi, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/120,759

(22) Filed: Mar. 13, 2023

(65) Prior Publication Data

US 2024/0311591 A1    Sep. 19, 2024

(51) Int. Cl.
*G06K 7/10* (2006.01)
*G06K 1/12* (2006.01)

(52) U.S. Cl.
CPC .......... *G06K 7/10366* (2013.01); *G06K 1/12* (2013.01)

(58) Field of Classification Search
CPC .............................. G06K 7/10366; G06K 1/12
USPC ....................................................... 235/451
See application file for complete search history.

(56) References Cited

U.S. PATENT DOCUMENTS

| | | | | |
|---|---|---|---|---|
| 6,246,326 | B1* | 6/2001 | Wiklof | G06K 17/0025 340/572.1 |
| 7,014,729 | B2* | 3/2006 | Grabau | B31D 1/028 156/290 |
| 7,842,152 | B2* | 11/2010 | Hamilton | G06K 17/00 156/227 |
| 7,969,283 | B2* | 6/2011 | Ohashi | G06K 7/0008 340/10.5 |
| 8,258,929 | B2* | 9/2012 | Wirrig | G06K 1/121 340/10.5 |
| 2005/0000842 | A1* | 1/2005 | Timmerman | B26D 5/32 53/399 |
| 2018/0276432 | A1* | 9/2018 | Manickam | G06K 7/10366 |
| 2019/0370623 | A1* | 12/2019 | Tsuchimoto | G06K 17/0025 |
| 2020/0019830 | A1* | 1/2020 | d'Armancourt | G06K 17/0025 |

FOREIGN PATENT DOCUMENTS

JP        2006-317526 A        11/2006

* cited by examiner

*Primary Examiner* — Ahshik Kim
(74) *Attorney, Agent, or Firm* — Foley & Lardner LLP

(57) ABSTRACT

A label printer includes a reader/writer, a head label, and a printer. The reader/writer is configured to write tag data into multiple wireless tags present within a communicable range of the reader/writer. The tag data is the same for one or more of the plurality of wireless tags. The head label includes a wireless tag of the multiple wireless tags and is positioned at a head in a conveying direction of the multiple labels. The printer is configured to print print data on the plurality of labels.

15 Claims, 6 Drawing Sheets

LABEL PRINTER AND CONTROL METHOD OF A LABEL PRINTER

FIELD

Embodiments described herein relate to a label printer and a control method of a label printer.

BACKGROUND

A label printer that prints a label can have a wireless tag such as a radio frequency identification (RFID) tag. A label printer prints a label that is used, for example, in the field of distribution or logistics. In a label printer, a reader/writer writes tag data into the wireless tag in the label, and a print head prints print data on the label. A label printer continuously executes the writing operation of the tag data and the printing operation of the print data on labels attached to a mount at predetermined intervals. The reader/writer designates the tag ID to write the tag data in accordance with a communication standard of the wireless tag.

DETAILED DESCRIPTION

Figure 1:
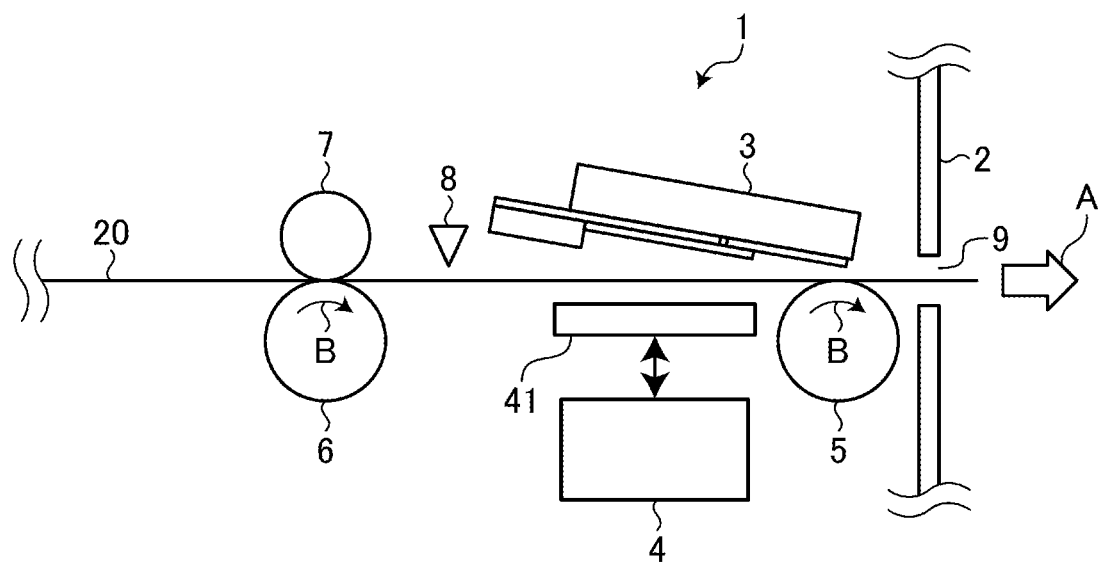
FIG. 1 is a diagram schematically illustrating a label printer, according to some embodiments.

A label printer that prints a label can have a wireless tag such as a radio frequency identification (RFID) tag. A label printer prints a label that is used, for example, in the field of distribution or logistics. In a label printer, a reader/writer writes tag data into the wireless tag in the label, and a print head prints print data on the label. A label printer continuously executes the writing operation of the tag data and the printing operation of the print data on labels attached to a mount at predetermined intervals. The reader/writer designates the tag ID to write the tag data in accordance with a communication standard of the wireless tag.

The tag data is read by a wireless tag reading apparatus such that the print data is recognized by a person. The tag data to be read by the wireless tag reading apparatus and the print data to be recognized by a person need to be correlated with each other one-to-one. For example, in a label attached to a commodity used in the field of distribution, commodity information (for example, a price or a commodity name) represented by tag data that is read by a wireless tag reading apparatus of a point of sales (POS) terminal needs to match with commodity information represented by print data that is recognized by a customer.

To that end, a label printer identifies a wireless tag of a print target label to be subsequently printed, and designates a tag ID of the identified wireless tag to write tag data correlated with print data into the wireless tag. The identification of the wireless tag of the print target label is executed as follows.

First, a label printer conveys the print target label to a position where the print target label is closer to the reader/writer than the other labels, and the reader/writer communicates with the wireless tag. Second, the reader/writer identifies, as the wireless tag of the print target label, a wireless tag having the highest field intensity of a response signal among wireless tags of a plurality of labels present in a communicable range.

However, if the interval between the labels attached to the mount is short, there may be error in the identification of the wireless tag of the print target label depending on conveyance error of a label or a radio wave status of the periphery. As a result, there is a situation where the print data printed on the label and the tag data written in the wireless tag are not correlated with each other.

Accordingly, a label printer where the print data printed on the label and the tag data written in the wireless tag can be reliably correlated with each other is desired.

Referring to FIGS. 1-8, a label printer, shown as label printer 1, is a label printer that writes tag data into a wireless tag in a label disposed at a predetermined interval and prints print data correlated with the tag data on the label. The label printer can include: a reader/writer (a transceiver, a RFID transceiver, a receiver/transmitter, a digital file reader/writer, a computer memory flashing device configured to flash one or more writable devices such as a wireless tag, a RFID tag, etc.), shown as reader/writer 4, configured to write the same tag data into a plurality of wireless tags present in a communicable range and including a wireless tag in a head label positioned at a head in a conveying direction of the label; and a printing unit (e.g., printer) configured to print print data correlated with the tag data that is written by the reader/writer on the head label.

Figure 2:
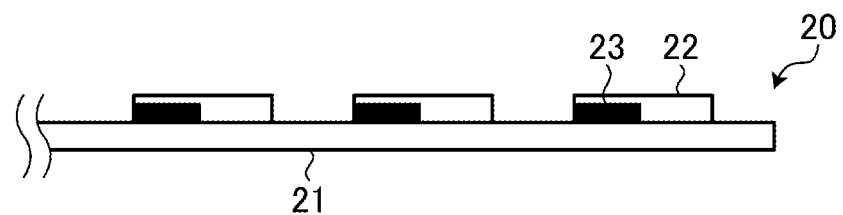
FIG. 2 is a diagram illustrating label of the label printer of FIG. 1, according to some embodiments.

Referring to FIGS. 1-8, a label printer 1 according to some embodiments is described with reference to the drawings. FIG. 1 is a diagram schematically illustrating a part (i.e., portion) of the label printer 1. The label printer 1 is communicatively connected to an external apparatus (e.g., a control device, a computer, a computing device, a data administration system, etc.) in a wired or wireless manner (e.g., via a communications module of the label printer 1 being communicably connected to the external apparatus via a direct connection or via an indirect connection, e.g., via a communications network, a wireless communications network, a local area network, a short range wireless communications network, the internet, a cellular network, a local area network, one or more processors, an external processing circuit, etc.). Referring now to FIGS. 1-2, the label printer 1 prints print data on labels 22 attached to label paper 20 at predetermined intervals based on information acquired from the external apparatus. In addition, the label printer 1 writes tag data into wireless tags 23 in the labels 22 based on information acquired from the external apparatus.

In some embodiments, the label printer 1 includes a print head 3, a reader/writer 4, a platen roller 5, a conveying roller 6, a driven roller 7, and a label sensor 8 in a main body 2.

In some embodiments, the print head 3 extends in a width direction of the label paper 20 perpendicular to a conveying direction of the label paper 20 indicated by an arrow A, that is, in a direction perpendicular to the paper plane in FIG. 1. The print head 3 is a line thermal head where a plurality of heating elements are provided, for example, in the width direction. The print head 3 is pressed against the platen roller 5 through the label paper 20. The print head 3 prints print data on the labels 22 on the label paper 20. If the print head 3 prints print data on the label 22, a position to which the labels 22 is conveyed will be referred to as "printable position". In addition, a position where the wireless tag 23 in the label 22 at the printable position is present will be referred to as "print position". The print head 3 is an example of the printing unit.

In some embodiments, the reader/writer 4 includes an antenna 41. The antenna 41 is provided at close range from a conveyance path of the label paper 20. The antenna 41 is controlled by the reader/writer 4 to transmit a radio wave and to receive a response wave transmitted from the wireless tag 23 that receives the radio wave. The response wave includes a tag ID of the wireless tag 23 as the transmission source.

In some embodiments, the antenna 41 is provided close to the print position. As a result, a communication area of the radio wave transmitted from the antenna 41, that is, a communicable range of the reader/writer 4 includes the print position. In other words, the wireless tag 23 at the print position can communicate with the antenna 41.

Figure 3:
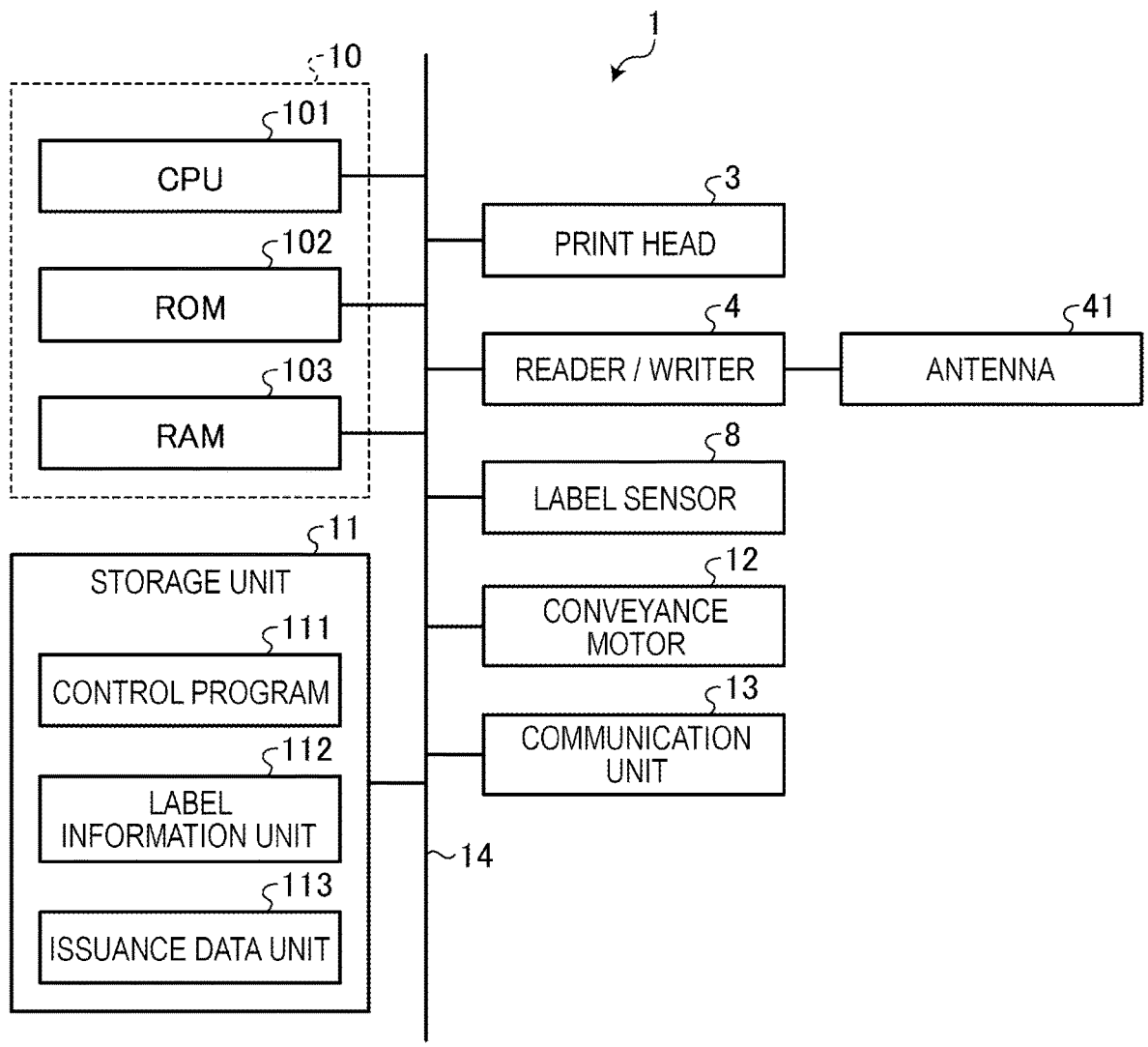
FIG. 3 is a block diagram illustrating the label printer of FIG. 1, according to some embodiments.

As shown in FIGS. 1-3, the reader/writer 4 writes the tag data into the wireless tag 23, according to some embodiments. For example, the reader/writer 4 emits a radio wave when receiving an writing instruction of the tag data from a control unit 10 (e.g., controller, microcontroller, processor, processing circuit, computing device, etc.) of the label printer 1 (refer to FIG. 3). The reader/writer 4 receives a response wave including the tag ID from the wireless tag 23 present in the communicable range. The reader/writer 4 outputs the tag ID and the tag data of the wireless tag 23 into which the tag data is to be written. That is, the reader/writer 4 designates the tag ID and outputs the tag data based on the tag ID. As a result, the reader/writer 4 writes the tag data into the wireless tag 23 of which the tag ID is designated.

In some embodiments, if the writing operation of the tag data is completed, the wireless tag 23 outputs a writing completion signal including the tag ID and information representing the writing completion of the tag data. When receiving the writing completion signal output from the wireless tag 23, the reader/writer 4 determines that the writing operation is normally completed.

In some embodiments, the reader/writer 4 writes the same tag data into all of the wireless tags 23 present in the communicable range (e.g., communicable range Z). Specifically, the reader/writer 4 correlates the tag IDs and the tag data with each other and sequentially outputs the correlated data regarding all of the wireless tags 23 present in the communicable range. In other words, the reader/writer 4 designates the tag IDs of all of the wireless tags 23 present in the communicable range to output the same tag data.

In some embodiments, the platen roller 5 is provided at a position facing the print head 3. The platen roller 5 is driven by a conveyance motor 12 (refer to FIG. 3) to rotate in a direction of an arrow B.

In some embodiments, the conveying roller 6 is driven by the conveyance motor 12 to rotate in the direction of the arrow B. The driven roller 7 is provided facing the conveying roller 6. The driven roller 7 conveys the label paper 20 by rotating in a state where the label paper 20 is interposed between the driven roller 7 and the conveying roller 6. The platen roller 5, the conveying roller 6, the driven roller 7, the conveyance motor 12, and the like configure the conveying unit (e.g., conveyor). After the tag data is written in the wireless tags 23 and the print data is printed on the labels 22, the conveying unit discharges the labels 22 from a discharge port 9 formed in the main body 2.

In some embodiments, the label sensor 8 detects the label 22 of the label paper 20. For example, the label sensor 8 detects the label 22 that is conveyed on the conveyance path by optically detecting a leading edge of the label 22 on the conveying direction side. The label printer 1 conveys the label 22 to a desired position based on a detection signal of the label sensor 8.

Referring now to FIG. 2, the label paper 20 used in the label printer 1 is described, according to some embodiments. FIG. 2 is a diagram illustrating the label paper 20. As illustrated in FIG. 2, the label paper 20 includes a belt-shaped mount 21 and the labels 22 attached to a surface of the mount 21 at regular intervals.

In some embodiments, the mount 21 is wound in a roll shape. FIG. 2 illustrates a state where leading end portion of the label paper 20 wound in a roll shape. The mount 21 is configured with release paper or the like, and the labels 22 can be released from the mount 21.

In some embodiments, the labels 22 are attached to the mount 21 at regular intervals in a longitudinal direction of the mount 21, that is, the conveying direction of the label paper 20. In each of the labels 22, the wireless tag 23 is sealed as illustrated in FIG. 2. The wireless tag 23 is also called a RF tag or an IC tag and has a structure in which an IC chip and an antenna (both of which are not illustrated) are built. The IC chip includes a control unit and a memory unit.

In some embodiments, the wireless tag 23 supplies power to each of the units of the IC chip through the radio wave transmitted from the antenna 41. The wireless tag 23 is controlled by the control unit in the IC chip to write data into the memory unit or to read data from the memory unit.

In some embodiments, the memory unit of the wireless tag 23, a setting area where data is stored in a non-rewritable manner and a user area where any data is writeable are configured. In the setting area, the tag ID is written in advance. The tag ID is a code unique to the wireless tag that is set to identify each of the wireless tags 23, and is an example of the tag identification information. In the user area, the tag data transmitted from the antenna 41 is written.

Referring to FIG. 3, a hardware configuration of the label printer 1 is described. FIG. 3 is a block diagram illustrating the hardware configuration of the label printer 1, according to some embodiments. The label printer 1 includes the control unit 10, a storage unit 11, the print head 3, the reader/writer 4 including the antenna 41, the label sensor 8, the conveyance motor 12, and a communication unit 13. The control unit 10, the storage unit 11, the print head 3, the reader/writer 4 including the antenna 41, the label sensor 8, the conveyance motor 12, and the communication unit 13 are connected to each other via a bus 14.

In some embodiments, the control unit 10 includes a central processing unit (CPU) 101, a read only memory (ROM) 102, and a random access memory (RAM) 103. The CPU 101, the ROM 102, and the RAM 103 are connected to each other via the bus 14.

In some embodiments, the CPU 101 controls an overall operation of the label printer 1. The CPU 101 is an example of a processor. The ROM 102 stores various programs such as a program used for driving the CPU 101 or various data. The RAM 103 is used as a work area of the CPU 101, and loads various programs or various data stored in the ROM 102 or the storage unit 11. The CPU 101 executes various control processes of the label printer 1 by operating in accordance with a control program that is stored in the ROM 102 or the storage unit 11 and is loaded to the RAM 103.

In some embodiments, the storage unit 11 is configured with a storage medium such as a hard disk drive (HDD) or a flash memory and maintains the storage content even if a power supply is interrupted. The storage unit 11 stores a control program 111, a label information unit 112, and an issuance data unit 113.

In some embodiments, the control program 111 is a program for implementing a function of acquiring the print data or the tag data from the external apparatus, a function of controlling the print head 3 to print the print data on the label 22, a function of controlling the reader/writer 4 to write the tag data into the wireless tag 23, a function of controlling the conveyance motor 12 to convey the label paper 20, and the like. The control program 111 includes other various control programs for operating the label printer 1.

In some embodiments, the label information unit 112 stores information regarding the label paper 20 to be used. The information regarding the label paper 20 includes data regarding the label paper 20 required to convey the label 22 to a desired position, for example, the size of the label 22 or a label pitch (an interval between the labels 22).

In some embodiments, the information stored in the label information unit 112 is input from, for example, an operation unit (not illustrated) by a user. The label printer 1 may convey the set label paper 20, may recognize the label paper 20 based on detection information of the label sensor 8, and may store the recognized information in the label information unit 112.

In some embodiments, the issuance data unit 113 stores issuance data received from the external apparatus. Specifically, the issuance data unit 113 stores issuance data including the tag data and the print data correlated with the tag data. The issuance data includes the number of labels to be issued.

In some embodiments, the configurations and the functions of the print head 3, the reader/writer 4, the antenna 41, and the label sensor 8, are as described herein.

In some embodiments, the conveyance motor 12 drives the platen roller 5 and the conveying roller 6 to convey the label paper 20 in the direction indicated by the arrow A in FIG. 1. In addition, by reverse the rotation of the conveyance motor 12, optionally, the label paper 20 is conveyed in a direction opposite to the direction indicated by the arrow A in FIG. 1.

In some embodiments, the communication unit 13 is an interface for communication with the external apparatus. The control unit 10 is connected to the external apparatus via the communication unit 13 such that information (data) can be transmitted to and received from the external apparatus.

Figure 4:
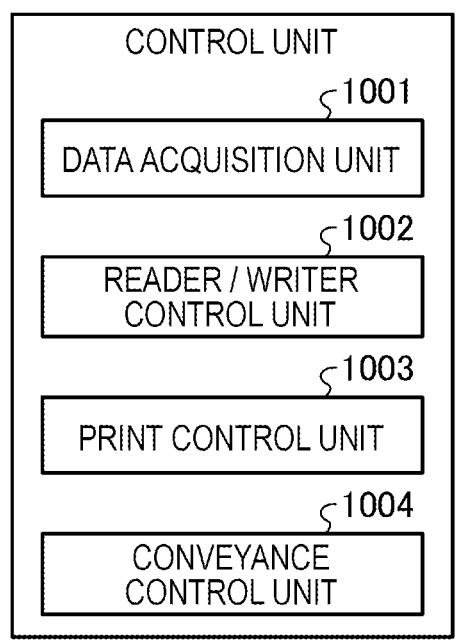
FIG. 4 is a block diagram illustrating a control unit of the label printer of FIG. 1, according to some embodiments.

In some embodiments, next, a functional configuration of the control unit 10 of the label printer 1 will be described. FIG. 4 is a block diagram illustrating the main functional configuration of the control unit 10 of the label printer 1. By the CPU 101 operating in accordance with the control program stored in the ROM 102 or the storage unit 11, the control unit 10 functions as a data acquisition unit 1001, a reader/writer control unit 1002, a print control unit 1003, and a conveying control unit 1004. In other words, the function of each of the functional units is implemented by the operation of the CPU 101. Each of the functions may be configured with hardware such as a dedicated circuit.

In some embodiments, the data acquisition unit 1001 acquires the issuance data including the tag data or the print data. Specifically, the data acquisition unit 1001 receives information such as the print data such as character data or image data that is printed on the label 22, the number of labels on which the print data is printed, the tag data that is written into the wireless tag 23, or the number of wireless tags into which the tag data is to be written from the external apparatus. The data acquisition unit 1001 stores the acquired issuance data in the issuance data unit 113.

In some embodiments, the tag data and the print data acquired by the data acquisition unit 1001 are correlated with each other. For example, if the tag data to be written into the wireless tag 23 of the label 22 that is initially issued is, for example, a commodity ID of a commodity X, the print data to be printed on the label 22 is, for example, a barcode representing a commodity name, a price, the commodity ID of the commodity X.

In some embodiments, the reader/writer control unit 1002 controls the reader/writer 4 to write the tag data into the wireless tags 23. Specifically, the reader/writer control unit 1002 writes the same tag data into all of the wireless tags 23 present in the communicable range of the reader/writer 4.

In some embodiments, the print control unit 1003 controls the print head 3 to print the print data on the label 22.

In some embodiments, the conveying control unit 1004 controls the conveyance motor 12 to convey the label paper 20. For example, the conveying control unit 1004 conveys the print target label 22 to be subsequently printed, that is, a head label positioned at the head in the conveying direction of the label paper 20 to the printable position.

Figure 5:
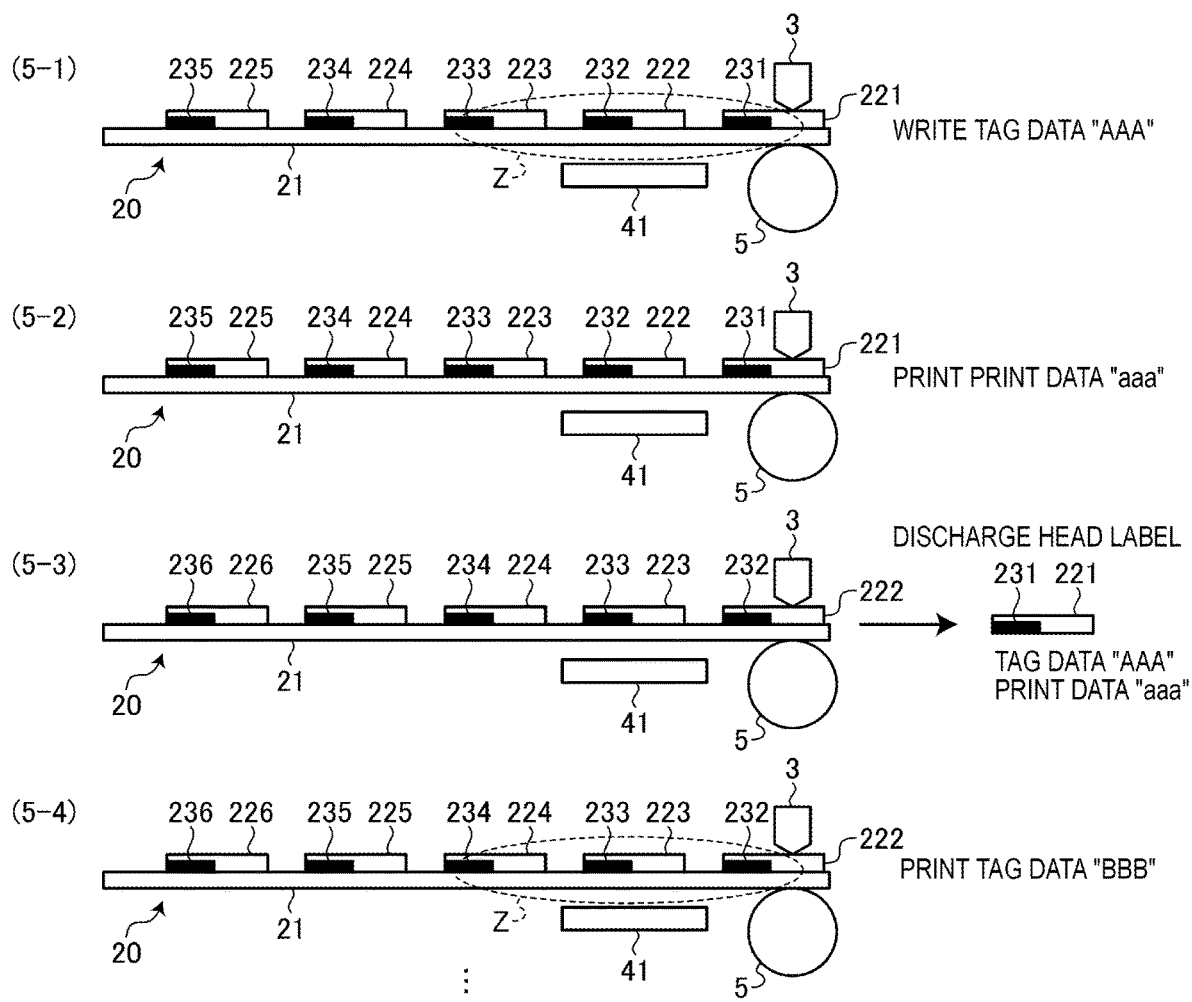
FIG. 5 is a diagram illustrating a label issuance method of the label printer of FIG. 1, according to some embodiments.

In some embodiments, continuous issuance of the label 22 in the label printer 1 having the above-described configuration will be described. The continuous issuance is a mode where the labels 22 are continuously issued. FIG. 5 is a diagram illustrating a label issuance method of the label printer 1. In FIG. 5, the print head 3 has a shape different from that of FIG. 1 but is assumed to have the same shape as that of FIG. 1 for convenience of description.

In some embodiments, if a label issuance instruction is input to the control unit 10, as illustrated in (5-1), the label printer 1 conveys a head label 221 (e.g., a leading label, a first label, a first label of a set of labels, a first label of a portion of a set of multiple labels on the label paper) to the printable position (e.g., underneath the print head 3), the head label 221 being a label that is initially issued and being positioned at the head in the conveying direction of the label paper 20. At this time, a wireless tag 231 of the head label 221 is positioned in a communicable range Z (communications distance, communications space, transceiver range, etc.) of the reader/writer 4.

In some embodiments, a wireless tag 232 of a second label 222 and a wireless tag 233 of a third label 223 are also positioned in the communicable range Z of the reader/writer 4. On the other hand, a wireless tag 234 of a fourth label 224, a wireless tag 235 of a fifth label 225, and wireless tags 23 of subsequent labels 22 are not positioned in the communicable range Z of the reader/writer 4.

In some embodiments, in this state, the label printer 1 writes the same tag data "AAA" into the wireless tags 231, 232, and 233 in the communicable range Z of the reader/writer 4. Specifically, the reader/writer 4 emits a radio wave from the antenna 41 and receives response waves including the tag ID from the wireless tags 231, 232, and 233 positioned in the communicable range Z.

In some embodiments, the reader/writer 4 correlates the tag IDs and the tag data "AAA" with each other and sequentially outputs the correlated data regarding the wireless tags 231, 232, and 233. As a result, the tag data "AAA" is sequentially written into each of the user areas of the wireless tags 231, 232, and 233. The reader/writer 4 verifies that the tag data is normally written based on the writing completion signal from the wireless tags 231, 232, and 233.

In some embodiments, next, the label printer 1 temporarily stops the operation of the reader/writer 4. The label printer 1 prints print data "aaa" correlated with the tag data "AAA" on the head label 221. Specifically, the print head 3 prints the print data "aaa" on the surface of the head label (refer to (5-2)).

In some embodiments, if the printing operation of the print data "aaa" is completed, as illustrated in (5-3), the label printer 1 conveys the label paper 20 and discharges the head label 221 from the discharge port 9. The print data "aaa" is printed on the discharged label 221, and the tag data "AAA" is written in the wireless tag 231 built in the label 221. At this time, the label 222 to be subsequently issued becomes the head label.

In some embodiments, in (5-3), if the discharge operation of the label 221 is completed, the label 222 as the head label is positioned at the printable position. However, after the discharge operation of the label 221 is completed, the label paper 20 may be separately conveyed to position the label 222 at the printable position.

In some embodiments, in a state where the label 222 as the head label is positioned at the printable position, the label printer 1 writes tag data "BBB" into the wireless tags 232, 233, and 234 as in the state of (5-1). At this time, the tag data "AAA" in the wireless tags 232 and 233 are overwritten with the tag data "BBB". That is, the tag data of the wireless tags 232 and 233 is rewritten from "AAA" into "BBB".

In some embodiments, hereinafter, the label printer 1 repeats the same operation. Specifically, the label printer 1 prints print data "bbb" correlated with the tag data "BBB" on the label 222 as in the state of (5-2). In addition, the label printer 1 discharges the label 222 from the discharge port 9 as in the state of (5-3). This way, the label printer 1 continuously issues the labels 22.

In some embodiments, by continuously issuing the labels 22 as described above, the print data to be printed on the label 22 and the tag data to be written into the wireless tag 23 of the label can be reliably correlated with each other. More specifically, the label printer 1 writes the tag data into the wireless tags 23 of a plurality of labels 22 including the head label without executing the process of identifying the wireless tag 23 of the head label to which the tag data is to be written. Therefore, mismatch between the print data printed on the label 22 and the tag data to be written into the wireless tag 23 of the label 22 caused by error in the identification of the wireless tag 23 of the head label can be prevented.

Figure 6:
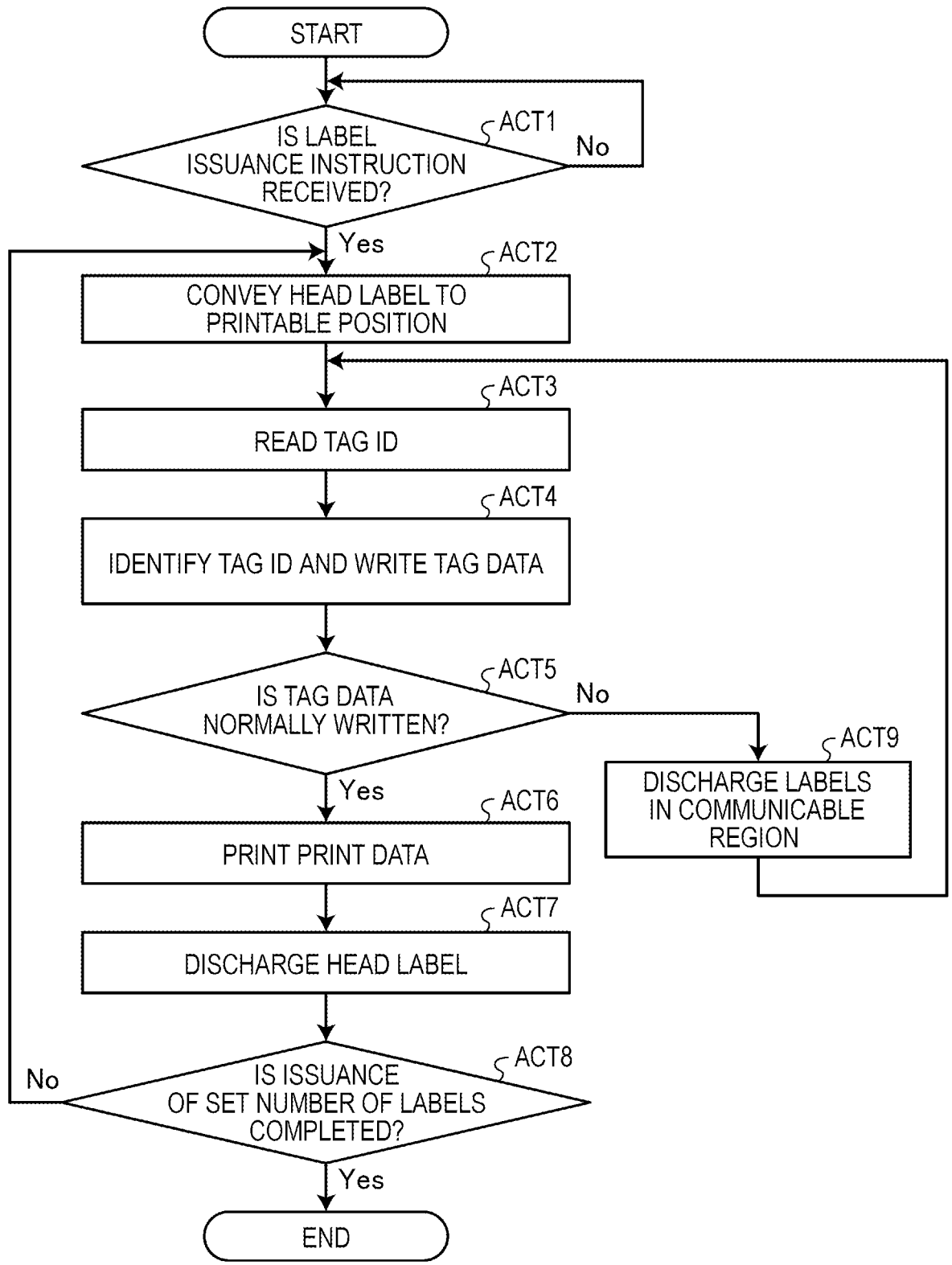
FIG. 6 is a flowchart illustrating a continuous issuance process by the control unit of the label printer of FIG. 1, according to some embodiments.

FIG. 6 is a flowchart illustrating the flow of the continuous issuance process by the control unit 10, according to some embodiments. The control unit 10 determines whether the label issuance instruction is received from an operation unit (not illustrated) (ACT 1), and if the label issuance instruction is not received (N in ACT 1), the control unit 10 returns to the process of ACT 1 and waits.

In some embodiments, if the control unit 10 receives the label issuance instruction (Y in ACT 1), the conveying control unit 1004 conveys the head label to the printable position (ACT 2). At this time, the wireless tags 23 of the plurality of labels including the head label are present in the communicable range of the reader/writer 4. The reader/writer control unit 1002 controls the reader/writer 4 to read the tag ID of the wireless tags 23 in the communicable range (ACT 3).

In some embodiments, next, the reader/writer control unit 1002 controls the reader/writer 4 to write the tag data into the wireless tags 23. Specifically, the reader/writer 4 designates the read tag ID to write the same tag data into all of the wireless tags 23 present in the communicable range (ACT 4).

In some embodiments, the control unit 10 determines whether the tag data is normally written in all of the wireless tags in which the tag data is written by the reader/writer 4 (ACT 5). The control unit 10 makes the determination of ACT 5 based on the writing completion signal output after the writing operation of each of the wireless tags 23.

In some embodiments, if the tag data is normally written in all of the wireless tags 23 in the communicable range (Y in ACT 5), the print control unit 1003 controls the print head 3 to print the print data on the head label at the printable position (ACT 6). Next, the conveying control unit 1004 controls the conveyance motor 12 to convey the label paper 20 and to discharge the head label from the discharge port 9 (ACT 7).

In some embodiments, the control unit 10 determines whether the issuance of a set number of labels 22 designated by the received label issuance instruction is completed (ACT 8), and if the issuance of the labels 22 is completed (Y in ACT 8), the control unit 10 ends the continuous issuance process. If the issuance of the labels 22 is not completed (N in ACT 8), the control unit 10 returns to the process of ACT 2.

In some embodiments, if the tag data is not normally written in any of the labels in the process of ACT 5 (N in ACT 5), the conveying control unit 1004 controls the conveyance motor 12 to discharge the labels 22 in the communicable range (three labels in the example of FIG. 5) from the discharge port 9 (ACT 9). That is, if the tag data is not normally written in one or a plurality of wireless tags 23 present in the communicable range, the conveying control unit 1004 discharges all of the labels 22 present in the communicable range from the discharge port 9. The reader/writer 4 may retry to execute the writing operation a preset number of times before executing the process of ACT 9.

In some embodiments, at this time, the control unit 10 may notify the user of error information. In this case, the error information may be notified by a display unit or a speech output unit (both of which are not illustrated). The error information is information representing that the tag data is not normally written in the wireless tag 23 of the discharged label 22. If the user recognizes the notified error information, the user discards the discharged label 22.

In some embodiments, the control unit 10 returns to the process of ACT 3. If the process proceeds from ACT 9, the writing operation of the tag data in ACT 4 is an operation of writing again the tag data that is not normally written.

In some embodiments, through the continuous issuance process, the label printer 1 can reliably make the print data to be printed on the label 22 and the tag data to be written into the wireless tag 23 of the label 22 match with each other.

In some embodiments, next, a modification example of the continuous issuance process will be described. The continuous issuance process according to the modification example is effective, for example, if the antenna 41 of the reader/writer 4 cannot be provided close to the print head 3 due to a structural restriction of the label printer 1. Specifically, the continuous issuance process according to the modification example is effective for the label printer 1 having a structure where the print position is not present in the communicable range of the reader/writer 4. Therefore, it is assumed that the label printer 1 according to the modification example has the structure where the print position is not present in the communicable range of the reader/writer 4.

Figure 7:
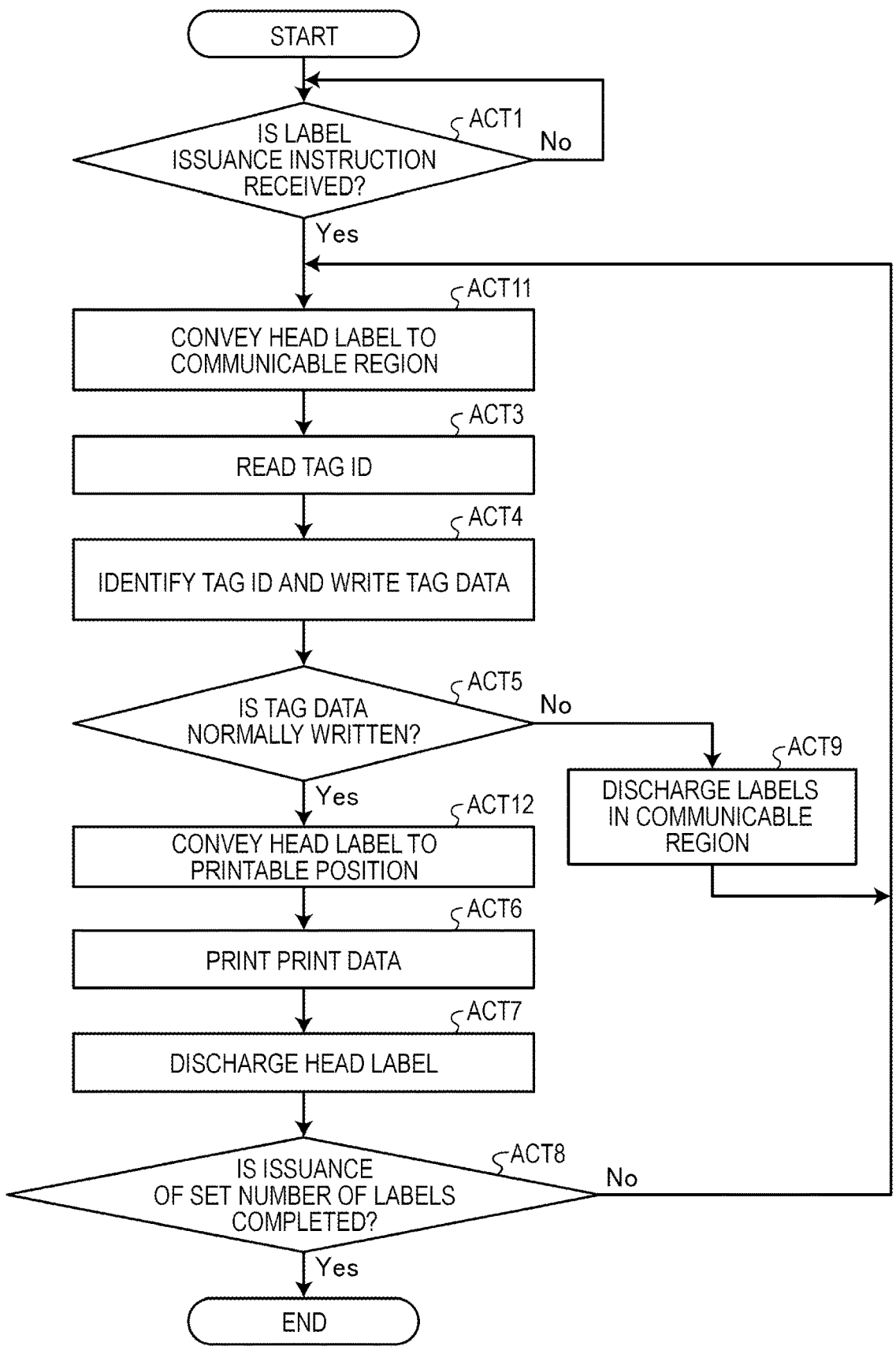
FIG. 7 is a flowchart illustrating a continuous issuance process by a control unit of a label printer of FIG. 1, according to some embodiments.

FIG. 7 is a flowchart illustrating the flow of the continuous issuance process by the control unit 10, according to some embodiments. The same processes as those of FIG. 6 are represented by the same reference numerals, and the duplicate description thereof will not be repeated.

In some embodiments, if the control unit 10 receives the label issuance instruction (Y in ACT 1), the conveying control unit 1004 conveys the head label into the communicable range of the reader/writer 4 (ACT 11). At this time, the head label is not present in the printable position. Through the processes of ACT 3 and ACT 4, the reader/writer 4 writes the tag data into the wireless tags 23 in the communicable range.

In some embodiments, if the tag data is normally written in all of the wireless tags 23 in the communicable range (Y in ACT 5), the conveying control unit 1004 controls the conveyance motor 12 to convey the head label to the printable position (ACT 12).

In some embodiments, the subsequent processes of ACT 6 to ACT 8 are the same as those of FIG. 6. If the tag data is not normally written in the process of ACT 5 (N in ACT 5), the conveying control unit 1004 controls the conveyance motor 12 to discharge the labels 22 in the communicable range from the discharge port 9 (ACT 9). The control unit 10 returns to the process of ACT 11. As in FIG. 6, the reader/writer 4 may retry to execute the writing operation a preset number of times before executing the process of ACT 9.

In some embodiments, through the continuous issuance process according to the modification example, even the label printer having the structure where the antenna 41 of the reader/writer 4 and the print head 3 are not close to each other can reliably make the print data to be printed on the label 22 and the tag data to be written into the wireless tag 23 of the label 22 match with each other.

In some embodiments, the label printer 1 is the label printer 1 that writes tag data into the wireless tag 23 in the label 22 disposed at a predetermined interval and prints print data correlated with the tag data on the label 22, the label printer 1 including: the reader/writer 4 configured to write the same tag data into a plurality of wireless tags 23 present in the communicable range and including the wireless tag 23 in the head label positioned at the head in the conveying direction of the label 22; and the print head 3 configured to print print data correlated with the tag data that is written by the reader/writer 4 on the head label.

In some embodiments, as a result, the label printer 1 can reliably make the print data to be printed on the label 22 and the tag data to be written into the wireless tag 23 of the label 22 match with each other.

In addition, in the label printer 1, the reader/writer 4 reads a tag ID of a plurality of wireless tags 23 positioned in the communicable range and designates the read tag ID to output the tag data, according to some embodiments.

As a result, while executing communication in accordance with a communication standard of the wireless tag, the label printer 1 can reliably make the print data to be printed on the label 22 and the tag data to be written into the wireless tag 23 of the label 22 match with each other, according to some embodiments.

Further, in the label printer 1, if the print head 3 prints the label 22, a print position where the wireless tag 23 in the label 22 is positioned is in the communicable range of the reader/writer 4, according to some embodiments.

As a result, the label printer 1 can write the tag data into the wireless tag 23 in the label 22 at the position where the label 22 is printed. Therefore, the label printer 1 can simply control the conveying unit (e.g., conveyor), according to some embodiments.

In addition, in the label printer 1 according to the modification example, if the print head 3 prints the label 22, a print position where the wireless tag 23 in the label 22 is positioned is outside the communicable range of the reader/writer 4, and the label printer 1 further includes a conveying unit (e.g., conveyor) configured to convey the head label into the communicable range of the reader/writer 4 before the reader/writer 4 writes the tag data into the wireless tag 23 and to convey the head label to the print position before the print head 3 prints the label 22, according to some embodiments.

As a result, even the label printer having the structure where the antenna 41 of the reader/writer 4 and the print head 3 are not close to each other can reliably make the print data to be printed on the label 22 and the tag data to be written into the wireless tag 23 of the label 22 match with each other, according to some embodiments.

While certain embodiments have been described, these embodiments have been presented by way of example only, and are not intended to limit the scope of the disclosure. For example, the present disclosure is not limited to the label printer 1 that continuously issues labels and may be applied to a label printer that issues one label. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A method, comprising:
    conveying, via a conveyor, a plurality of labels in a conveying direction, each of the labels including a wireless tag, and a head label of the plurality of labels being positioned at a head in the conveying direction;
    simultaneously writing, via a reader/writer, first tag data into the plurality of wireless tags;
    printing, via a printer, first print data onto the head label, the first print data correlated with the first tag data of the wireless tag of the head label;
    overwriting, by the reader/writer, the first tag data on a wireless tag of a second label of the plurality of labels with second tag data; and
    printing, via the printer, second print data onto the second label, the second print data correlated with the second tag data.

2. The method of claim 1, wherein the writing of the first tag data includes:
    reading, via the reader/writer, tag identification information of a plurality of wireless tags positioned in the communicable range of the reader/writer;
    associating the tag identification information with the first tag data; and
    outputting, via the reader/writer, the first tag data associated with the tag identification information.

3. The method of claim 2, wherein outputting the first tag data associated with the tag identification information includes:
    writing, via the reader/writer, the first tag data associated with the tag identification information to one or more wireless tags of the plurality of wireless tags.

4. The method of claim 1, wherein simultaneously writing, via the reader/writer, the first tag data into the plurality of wireless tags includes simultaneously writing, via the reader/writer, the first tag data into the wireless tag of the head label, the wireless tag of the second label, and a wireless tag of a third label.

5. The method of claim 1, further comprising conveying, via the conveyor, the plurality of labels in the conveying direction after the first print data are printed onto the head label by the printer.

6. The method of claim 1, wherein the printer is positioned downstream of the reader/writer in the conveying direction.

7. A label printer system, comprising:
a plurality of labels each including a wireless tag, the plurality of labels comprising a first label and a second label;
a reader/writer configured to (a) simultaneously write first tag data into the wireless tags of the first label and the second label, the first tag data being the same for both of wireless tags and corresponding to first tag data of the first label, and (b) overwrite the first tag data on the wireless tag of the second label with second tag data;
a printer configured to print print data on the first label, the print data correlated with the first tag data of the first label; and
a conveyor configured to convey the first label into a communicable range of the reader/writer.

8. The label printer system of claim 7, wherein the reader/writer is configured to read tag identification information of the plurality of wireless tags, associate the tag identification information with the first tag data, and output the first tag data.

9. The label printer system of claim 7, wherein the printer is configured to print the print data on the first label when the first label is in a print position, wherein the wireless tag is positioned within the communicable range of the reader/writer when the first label is in the print position.

10. The label printer system of claim 9, wherein the reader/writer comprises a transceiver; and
wherein the printer is positioned downstream of the transceiver in the conveying direction of the label.

11. The label printer system of claim 7, wherein the conveyor is configured to convey the first label into the communicable range of the reader/writer before the reader/writer writes the first tag data into the wireless tag and to convey the first label to a print position before the printer prints the print data on the first label.

12. The label printer system of claim 7, wherein the printer is configured to print the print data on the first label when the wireless tag of the first label is positioned is outside the communicable range of the reader/writer.

13. The label printer system of claim 7, wherein the conveyor is configured to convey the first label into the communicable range of the reader/writer before the reader/writer writes the first tag data into the wireless tag of the first label and to convey the first label to a print position before the printer prints the print data onto the first label.

14. The label printer system of claim 7, wherein the printer is positioned downstream of the reader/writer in a conveying direction of the conveyor.

15. The label printer system of claim 7, wherein the reader/writer is configured to overwrite the first tag data on the wireless tag of the second label with the second tag data after the printer has printed the print data on the first label.

* * * * *